June 20, 1933.  L. H. THOEN  1,914,837
WINDROW HEADER
Filed Jan. 26, 1927   2 Sheets-Sheet 1
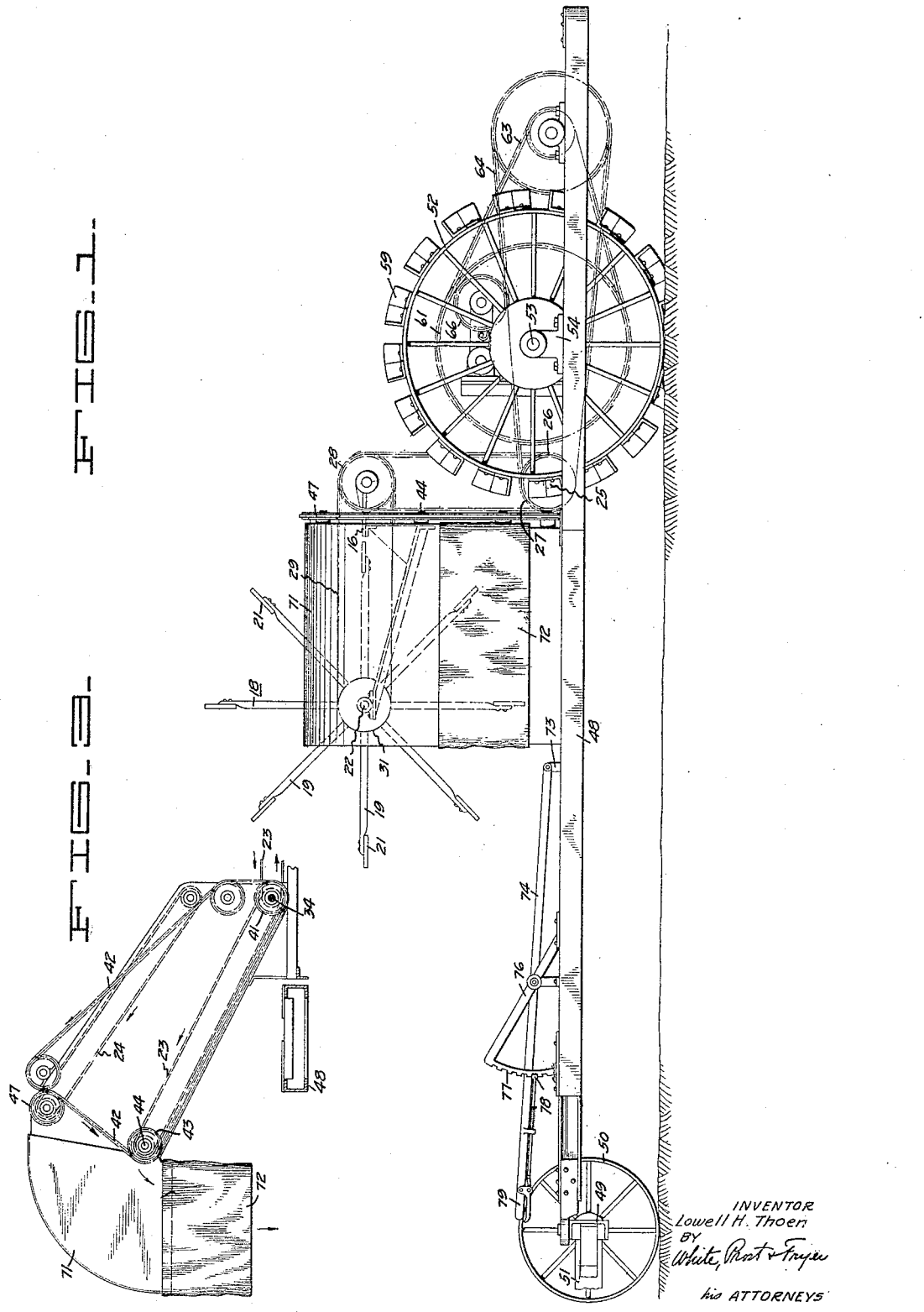
INVENTOR
Lowell H. Thoen
BY
his ATTORNEYS

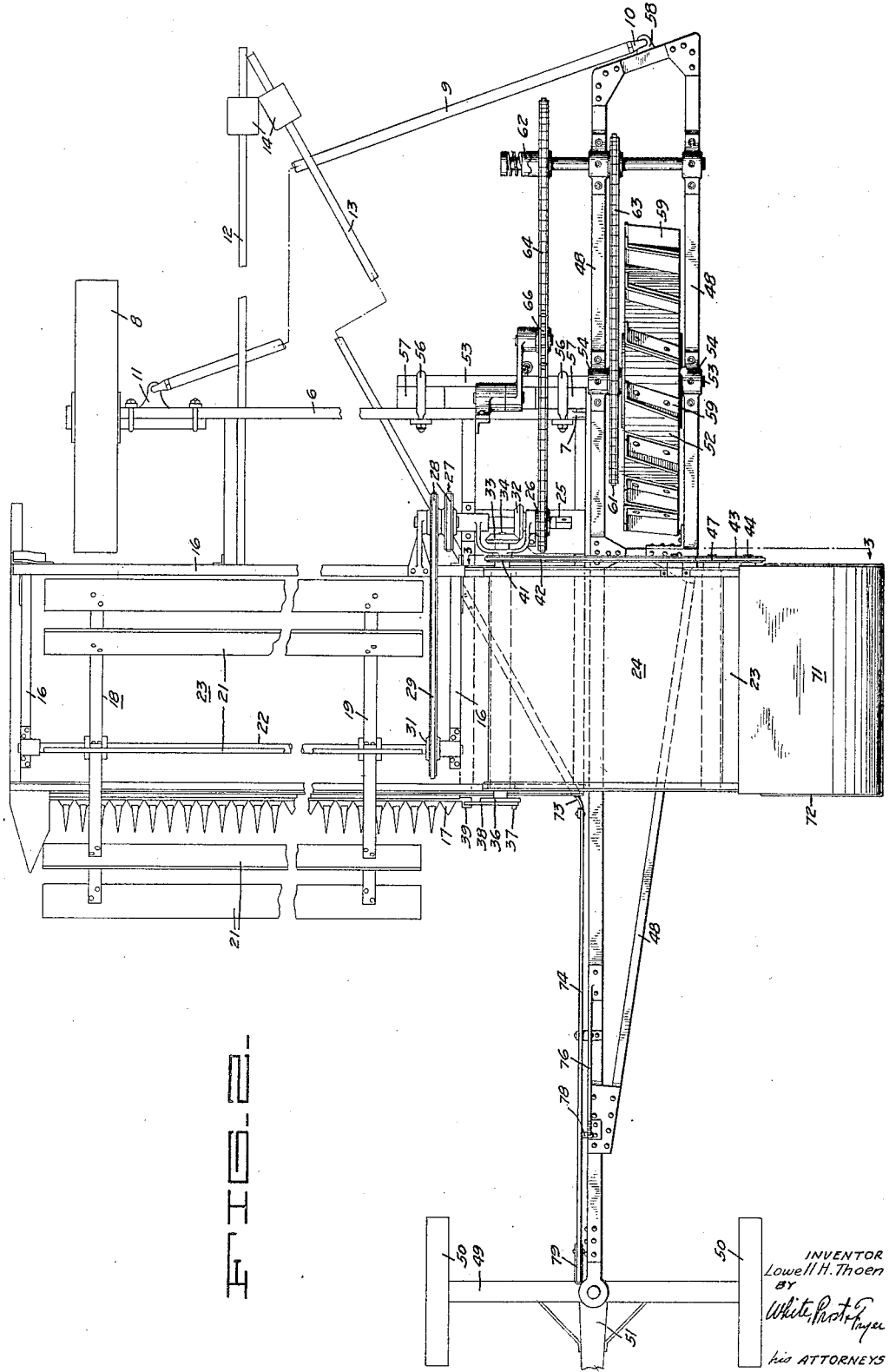

Patented June 20, 1933

1,914,837

UNITED STATES PATENT OFFICE

LOWELL H. THOEN, OF STOCKTON, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA

WINDROW HEADER

Application filed January 26, 1927. Serial No. 163,665.

My invention relates to harvesting machinery, and especially to combined harvesters of the type including a header to cut the standing grain and a separator for threshing the grain from the straw.

Standing grain is now almost universally harvested by means of combined harvesters which, in a single trip over the grain field, cut the standing grain and thresh it. There is no lapse of time between the cutting of the grain and the threshing of it. An expeditious handling of the harvesting operation is effected by the combined harvesters and nearly every grain ranch is provided with at least one of them. When the standing grain is damp or is interspersed with green weeds at the time it is cut and threshed by a combined harvester, it is likely to spoil in confinement after harvesting. If the damp grain could first be cut and left in windrows on the field to dry in the sun and then be picked up and threshed later, it would not be subject to spoiling. Such a procedure is impossible with the combined harvesters commonly used for cutting grain, and I have provided a machine by means of which grain can be cut and piled in windrows on the ground.

This machine can be especially constructed in its entirety for this purpose but since the widely used combined harvesters are made in two units, one of which is a header which cuts the standing grain and the other of which is a separator which threshes the cut grain, I preferably use a header unit detached from a combined harvester as a part of my machine. The scope of usefulness of a combined harvester is considerably extended by my invention as damp grain need not be immediately threshed as has heretofore been the case but can be cut and deposited in windrows to dry before threshing, thereby increasing the yield of desirable grain. There is usually no difficulty in detaching the header unit from the separator unit of a combined harvester, as the units are adapted to be separated for ready transportation.

It is an object of my invention to provide a vehicle for cutting standing grain and depositing it on the ground in windrows.

Another object of my invention is to provide means for using separately the header portion of a combined harvester.

An additional object of my invention is to provide means for driving a detached header of a combined harvester.

A further object of my invention is to provide means whereby the header unit of a combined harvester can be used to cut standing grain and deposit it on the field in windrows to dry. This is accomplished by disconnecting the header unit from the thresher unit, which carrier the normal driving mechanism, and providing a carriage to which the header unit is attached and by which it is operated as the carriage is propelled over the field of grain.

My invention possesses other advantageous features, some of which with the foregoing will be set forth at length in the following description where I shall outline in full that form of the windrow header of my invention, which I have selected for illustration in the drawings accompanying and forming part of the present specification. In said drawings I have shown one form of windrow header embodying my invention, but it is to be understood that I do not limit myself to such form since the invention, as set forth in the claims, may be embodied in a plurality of forms.

In the drawings:

Fig. 1 is a side elevation of the machine of my invention.

Fig. 2 is a plan of the machine of my invention.

Fig. 3 is a cross section showing the hood in elevation, the plane of the section being indicated by the line 3—3 in Fig. 2.

The windrow header of my invention preferably comprises a carriage to aid in supporting and propelling the detached header unit of a combined harvester, the carriage usually being provided with means for driving and controlling the header mechanism.

In the machine illustrated in the drawings, the header axle 6 is provided at one end with a header hook 7 which normally engages an eye on the separator unit of a combined harvester. The other end of the header axle carries a ground wheel 8 and is normally maintained in position by a push bar 9 hooked into an eye 11 adjacent the ground wheel. A hook 10 on the inner end of the push bar normally engages an eye at the rear of the separator unit of the combined harvester. Pivotally mounted on the axle 6 are two converging balance beams 12 and 13 which, at their extremities, carry weights 14 to balance header mechanism situated at the opposite ends of the balance beams.

The header mechanism includes a framework 16 preferably fabricated of steel angles and arranged to support a sickle bar 17. The sickle bar includes a plurality of blades comprising a sickle and also a plurality of guards which, in cooperation with the sickle blades, cut the standing grain. In order to guide the grain as it is cut, the reel 18 is provided which comprises a plurality of radial arms 19 supporting longitudinal blades 21. The reel is mounted on a reel shaft 22 journalled in the frame 16 and revolves in a direction to impel the grain cut by the sickle bar 17 to fall onto a conveyor or draper 23. The draper is a continuous belt passed about a roller at the outer end of the header frame 16 and carries the cut grain in a direction away from the wheel 8. A second or upper draper 24 overlies the inclined portion of the draper 23 and not only assists in conveying the cut grain but also protects the grain from wind.

The sickle bar 17, the reel 21 and the drapers 23 and 24 are normally driven by a stub shaft 25 connected to the thresher portion of the combined harvester. A gasoline engine is commonly provided on the separator portion and is joined with the stub shaft 25 thru suitable transmission mechanism. When the header is detached from the harvester, the shaft 25 is withdrawn from connection with the transmission mechanism and is provided with a sprocket 26. The outer end of the shaft 25 carries a sprocket 27 connected by a chain to one of a pair of sprockets 28. Another chain 29 links the other sprocket 28 with a sprocket 31 disposed on the end of the reel shaft 22 and rotates the reel in proportion to the speed of the stub shaft 25. Intermediate the ends of the stub shaft, a bevel gear 32 is carried which meshes with a second bevel gear 33 mounted on one end of shaft 34. The forward end of shaft 34 is provided with a plate 36 carrying a crank pin 37. A pitman 38 connects the pin 37 with another pin 39 disposed at one end of the sickle. Rotation of the shaft 34 by the gears 32 and 33 imparts the reciprocatory movement of the pitman 38 to the sickle. The drapers are also driven thru shaft 25. A sprocket 41 is mounted on the shaft 34 and thru a chain 42 transmits power to a sprocket 43 mounted on the draper shaft 44. The upper draper 24 is also driven thru the chains 42 by means of a sprocket 47.

By virtue of the pivotal mounting of the header frame 16 on the axle 6 and the nice adjustment of the counterweights 14 on the balance beams 12 and 13, the entire header mechanism is capable of being raised and lowered manually to accommodate itself to various heights of grain. The header as so far described is one of the units of a combined harvester which comprises the header and a separator mechanism. As separator mechanisms are well known in the art and form no part of my invention, none will be described herein.

In accordance with my invention, I have provided means whereby a header, detached from a combined harvester, can be utilized to cut standing grain and deposit it in windrows on the field. As shown in the drawings, I preferably provide a carriage comprising a triangular framework 48 of channel or angle iron flexibly connected at its forward end to an axle 49. At the extremities of the axle, wheels 50 are provided. Intermediate the wheels, a pole 51 is attached to the axle for the utilization of draft animals. In case a tractor is used, the axle 49 can be removed from the carriage leaving the flexibly connected forward end of the carriage to be fastened to the tractor. Means are provided for actuating the header mechanism when the stub shaft 25 is detached from the power plant on the harvester unit. Preferably these means utilize the motion of the carriage for indirectly deriving power from the draft means.

Adjacent the rear end of the triangular frame 48, a bull wheel 52 is situated and is adapted to revolve about a stationary axle 53 held to the frame by dolly blocks 54 bolted in place. The axle 53 extends from the side of the frame 48 and is lashed or clamped to the axle 6 of the header by means of suitable U-bolts 56 and interposed spacers 57. A rigid but readily demountable connection is thereby made between the header detached from a combined harvester and the framework 48 comprised in the carriage. The framework is provided at its rear end with an eye 58 to receive the hook 10 on the end of the push bar 9. In order to compensate for the oblique thrust of the header mechanism, grousers 59 are provided on the bull wheel 52. The grousers are preferably situated at a considerable angle to the median plane of the wheel and engage the ground in a manner to resist the oblique thrust of the header mechanism. Power is derived from the rotation of the bull wheel by a sprocket wheel 61 adapted to be rotated by the bull wheel 52 and drive a snap clutch 62 by means of a sprocket chain 63. A second sprocket chain 64 extending from the clutch 62 engages the sprocket 26 slipped over and secured to the end of the stub shaft 25. An idler 66 maintains the chain 64 at the proper tension.

When the carriage is drawn forward by means of the tractor or other propelling means, the sickle bar is operated together with the reel and the two drapers. The grain is cut and is carried by the drapers over the carriage to a point above the ground and is discharged. To aid in directing the cut grain to fall in regular windrows upon the ground and as a protection from the wind, a suitable hood 71 is fitted around the upper ends of the two drapers and is provided with depending sides 72 usually constructed of canvas or other suitable fabric. In order to accommodate the header to uneven ground and also to cut the grain at any desired height from the ground, the pivotally mounted header can be raised and lowered by mechanism positioned at the front of the carriage. The header frame 16 is regularly provided with a strap 73 extending forward and normally connected to the Jacob staff of the combined harvester. When the header unit is removed from the combined harvester, the strap 73 is disconnected from the Jacob staff. Upon the attachment of the header to the carriage, one end of a lever 74 is linked to the strap 73. The lever is pivotally mounted on a support 76 secured to the framework 48. The support includes a serrated sector 77 with which a grip-controlled finger 78 cooperates to retain the lever 74 in position. The other end of the lever is formed with a handle 79 for convenient manual operation. When the handle 79 is raised and lowered, the lever 74 correspondingly changes the position of the header mechanism and varies the height of the sickle bar, reel and drapers.

It will be appreciated that with my invention, the header portion of a combined harvester can be detached therefrom and quickly and easily connected to the carriage of my invention in such a manner that the header unit can be driven thru a field of grain and will cut the grain and deposit it in windrows upon the ground to dry and that the motive power for driving the header is derived from the propelling means which draws the carriage.

I claim:

1. A windrow machine comprising a frame, a bull wheel journalled on said frame, a header essentially and pivotally mounted on an axle, means for joining said header to said frame with the axis of said wheel substantially coincident with said axle and means on said frame for rotating said header about said axle.

2. A windrow machine comprising a header unit, including an axle, a single wheel on said axle, and a grain conveyor extending beyond said axle; and a carriage having means for connection to said axle with the carriage disposed under and without touching said conveyor.

3. In a harvester; a header unit comprising a frame, a ground support therefor, and grain handling mechanism carried thereby including means to convey grain; a carriage unit comprising a frame and a ground support therefor; and means on said header unit to connect said header unit for attachment to said carriage unit with said conveying means positioned to discharge grain in a windrow onto the ground, said connecting means serving also to provide means of attachment of said header unit to a thresher unit to form a combined harvester-thresher.

4. In a harvester; a header unit as an independent article of manufacture and comprising a frame, a ground support therefor, and grain handling mechanism carried thereby including means to convey grain; a carriage unit as an independent article of manufacture and comprising a frame and a ground support therefor; and detachable means connecting said units with said conveying means positioned to discharge grain in a windrow onto the ground; said detachable means including means on the header for attachment to a thresher unit to provide a combined harvester-thresher.

5. In a harvester, a windrow machine comprising a header unit including a frame and means supported by said frame for optional and detachable connection to a thresher unit, a carriage unit, and means forming a detachable connection between said header unit and said carriage unit.

6. In a harvester, a carriage unit comprising supporting and driving means for a header unit, and means for detachably connecting said header unit and said carriage unit to provide a windrow machine.

7. In a harvester, a carriage unit, a header unit, means connecting said units including a non-rotatable axle for each unit, and means carried by said carriage for driving said header.

8. In a harvester, a carriage unit, a header unit, means for detachably connecting said units including a non-rotatable axle for each unit, and means carried by said carriage for driving said header.

9. In a harvester, a carriage unit including a non-rotatable axle, a header unit including a second non-rotatable axle, and means for connecting said units including means for rigidly uniting said axles.

10. In a harvester, a detachable carriage unit including a shaft, a detachable header unit including a shaft, and detachable means rigidly connecting said shafts to provide a windrow machine.

11. In a harvester, a carriage, a header, an axle on said carriage, an axle in said header, and means to lash said axles together.

12. In a harvester, a carriage including an axle, a header including an axle, adjacent end portions of said axles being in overlapping relationship, and means for rigidly securing said overlapping portions together.

13. In a harvester, a plurality of separable units, means for securing said units together including overlapped shafts, and means rigidly uniting the overlapped portions of the shafts.

14. In a harvester, a carriage unit as an independent article of manufacture and including a frame and a rotatable ground-engaging wheel supported thereby, means on said carriage for detachable connection to a header unit, and means carried by said carriage actuated by rotation of said wheel for driving said header.

15. In a harvester, a carriage unit as an independent article of manufacture, and means on said carriage for detachable connection to a header unit to provide a windrow machine.

16. A windrow machine comprising a header unit, a main supporting body therefor extending forwardly and rearwardly transversely of said header unit, and means for supporting the machine for movement over the ground comprising spaced ground-engaging members, one of which is on the header unit and another of which is on the main supporting body.

17. A windrow machine comprising a header unit having a draper, a main supporting body for the header unit and extending forwardly and rearwardly transversely of the draper, means for connecting said header unit and said body, including an axle on the header and an axle on the body united together, and means for supporting said machine for movement over the ground comprising a ground-engaging member on each axle.

18. A windrow machine comprising two structurally independent units, one being a header unit having a frame, a ground support therefor and material handling mechanism carried thereby, and the other unit being a carriage serving primarily to support the header unit, and means on the carriage unit and on the header unit to provide a connection between said units.

19. A windrow machine comprising a header unit having a draper, a main supporting frame unit for and at a side of said header unit and positioned to allow discharge of material from the draper in a windrow onto the ground, and means forming a quickly attachable connection between said units.

20. A windrow machine comprising a header unit having a draper, a main supporting frame unit for and at a side of said header unit and positioned to allow discharge of material from the draper in a windrow onto the ground, and a connection between said units, including a shaft on the header unit, a shaft on the supporting frame unit, and means for uniting said shafts.

21. A windrow machine comprising a header unit having a draper, a main supporting frame unit for and at a side of said header unit and positioned to allow discharge of material from the draper in a windrow onto the ground, and a connection between said units, including a shaft on the header unit, a shaft on the supporting frame unit, and means for uniting said shafts, and a ground-engaging wheel on each shaft.

22. A windrow machine comprising a header unit having a draper, a main supporting carriage unit at a side of said header unit and extending transversely with respect to the draper, the portion of said carriage adjacent the draper being below the plane of the draper to allow discharge of material from the draper in a windrow at the side of said carriage unit, and means connecting said carriage unit and said header unit.

23. A windrow machine including a carriage unit for a header unit, said header unit having a draper to convey and discharge material in a windrow at the side of said machine, and shrouding means at the discharge end of said draper to prevent scattering of material by the wind and to direct said material down onto the ground.

24. In a harvester, a main frame having a shaft, a header having a shaft substantially in axial alignment with said first-mentioned shaft and overlapping said first-mentioned shaft, and means rigidly connecting the overlapped shaft portions to provide an immovable connection between said shafts.

25. In a harvester machine, a main frame having an axle extending beyond a side thereof, a header having an axle substantially in axial alignment with said first-mentioned axle and overlapping said first-mentioned axle, a detachable connection rigidly connecting the overlapped axle portions to provide an immovable connection between said axles, and a ground-engaging wheel mounted on each axle to provide means for movement of the machine over the ground.

26. A windrow machine comprising two structurally independent units, including a header unit having a draper extending transversely with respect to the line of draft of said machine, and a carriage unit positioned at a side of and providing a main supporting frame for said header unit, said carriage unit extending forwardly and rearwardly transversely of said draper and said draper extending over said carriage unit to discharge material in a windrow at the side thereof, an axle on the header unit, an axle on the carriage unit, means for detachably connecting said header unit to said carriage unit including means to join said axles, and a ground-engaging wheel on each axle.

27. A windrow machine comprising two structurally independent units, including a header unit having a draper extending transversely with respect to the line of draft of said machine, and a carriage unit positioned at a side of and providing a main supporting frame for said header unit, said carriage unit extending forwardly and rearwardly transversely of said draper and said draper extending over said carriage unit to discharge material in a windrow at the side thereof, an axle on the header unit, an axle on the carriage unit, means for detachably connecting said header unit to said carriage unit including means to join said axles, a ground-engaging wheel on each axle, and a driving connection from said carriage unit ground-engaging wheel to operate elements on said header.

28. A windrow machine comprising a header unit having a draper extending transversely with respect to the line of draft of said machine, said header unit being of a construction adapted for optional and detachable connection to a thresher unit to provide a combined harvester-thresher machine with the discharge end of said draper adapted to project into the feeder house of said thresher, a carriage unit structurally independent from said header unit for providing a main supporting frame for said header unit to form said windrow machine, and means uniting said header unit and said carriage unit with said draper positioned to discharge material onto the ground in a windrow at the side of said carriage unit.

29. A windrow machine comprising a header unit having a draper extending transversely with respect to the line of draft of said machine, said header unit being of a construction adapted for optional and detachable connection to a thresher unit to provide a combined harvester-thresher machine with the discharge end of said draper adapted to project into the feeder house of said thresher, a carriage unit structurally independent from said header unit for providing a main supporting frame for said header unit to form said windrow machine, means detachably uniting said header unit and said carriage unit with said draper extending transversely with respect to said carriage unit to discharge material onto the ground in a windrow at the side of said carriage unit, said uniting means comprising means on the header unit serving to provide said optional connection of the header unit with said thresher unit, and including an axle on the header unit and an axle on the carriage unit, both of which axles are connected together, and a ground-engaging member on each axle.

30. A device for adapting a detached header unit of a combined harvester-thresher to form a windrow machine for cutting standing vegetation from a field and depositing said cut vegetation onto said field in windrows; said header unit including vegetation cutting means, means to convey said cut vegetation to the stubbleward side of said header unit, a header frame having a wheel support adjacent the vegetation side, and means adapted for optional connection to a thresher unit for supporting the stubbleward side of said header unit; said device comprising a carriage unit including a frame, a ground wheel for supporting said carriage frame, means on said carriage frame for attachment to said header unit connecting means adapted to be connected to said thresher unit, whereby said carriage unit supports said stubbleward side of said header unit which is unsupported when said header unit is detached from said thresher unit; said carriage unit having no part disposed on the stubbleward side of the vertical plane in which said header unit conveying means terminates, so that said conveying means can discharge cut grain upon the field in windrows without interference from said carriage unit.

31. A device for adapting a detached header unit of a combined harvester-thresher to form a windrow machine for cutting standing vegetation from a field and depositing said cut vegetation onto said field in windrows; said header unit including vegetation cutting means, means to convey said cut vegetation to the stubbleward side of said header unit, a header frame having a wheel support adjacent the vegetation side, and means adapted for optional connection to a thresher unit for supporting the stubbleward side of said header unit; said device comprising a carriage unit including a frame, a ground wheel for supporting said carriage frame, means on said carriage frame for attachment to said header unit connecting means adapted to be connected to said thresher unit, whereby said carriage unit supports said stubbleward side of said header unit which is unsupported when said header unit is detached from said thresher unit; said carriage unit connecting means including a shaft adapted to be joined to a shaft on the header unit in substantial axial alignment therewith, and said carriage unit having no part disposed on the stubbleward side of the vertical plane in which said header unit conveying means terminates, so that said conveying means can discharge cut grain upon the field in windrows without interference from said carriage unit.

32. A device for adapting a detached header unit of a combined harvester-thresher to form a windrow machine for cutting standing vegetation from a field and depositing said cut vegetation onto said field in windrows; said header unit including vegetation cutting means, means to convey said cut vegetation to the stubbleward side of said header unit, a header frame having a wheel support adjacent the vegetation side, and means adapted for optional connection to a thresher unit for supporting the stubbleward side of said header unit; said device comprising a carriage unit including a frame, a ground wheel for supporting said carriage frame, means on said carriage frame for attachment to said header unit connecting means adapted to be connected to said thresher unit, whereby said carriage unit supports said stubbleward side of said header unit which is unsupported when said header unit is detached from said thresher unit; said carriage unit connecting means including a shaft adapted to be joined to a shaft on the header unit in substantial axial alignment therewith, and means adapted to connect with a push pole connected to said header unit; and said carriage unit having no part disposed on the stubbleward side of the vertical plane in which said header unit conveying means terminates, so that said conveying means can discharge cut grain upon the field in windrows without interference from said carriage unit.

33. A device for adapting a detached header unit of a combined harvester-thresher to form a windrow machine for cutting standing vegetation from a field and depositing said cut vegetation onto said field in windrows; said header unit including vegetation cutting means, means to convey said cut vegetation to the stubbleward side of said header unit, a header frame having a wheel support adjacent the vegetation side, and means adapted for optional connection to a thresher unit for supporting the stubbleward side of said header unit; said device comprising a carriage unit including a frame, a ground wheel for supporting said carriage frame, means on said carriage frame for attachment to said header unit connecting means adapted to be connected to said thresher unit, whereby said carriage unit supports said stubbleward side of said header unit which is unsupported when said header unit is detached from said thresher unit; said carriage unit connecting means consisting essentially of a shaft adapted to be joined to a shaft on the header unit in substantial alignment therewith, a push pole connection for receiving an end of a push pole connected to said header unit, and a movable member adapted for connection with said header unit to effect adjustment of said header unit vegetation cutting means with respect to the ground.

34. A device for adapting a detached header unit of a combined harvester-thresher to form a windrow machine, comprising a wheeled carriage unit as an independent article of manufacture; said carriage unit having connecting means for attachment to connecting means on said header unit, said header unit connecting means being adapted for attachment to a thresher unit.

35. A device for adapting a detached header unit of a combined harvester-thresher to form a windrow machine, comprising a wheeled carriage unit as an independent article of manufacture; said carriage unit having connecting means for attachment to connecting means on said header unit, said header unit connecting means being adapted for attachment to a thresher unit, and means forming a driving connection from a wheel of said carriage unit to operate vegetation handling mechanism on said header unit.

36. A windrow machine comprising a header unit having vegetation handling mechanism supported entirely thereby, a carriage unit, and means for detachably connecting said units with said vegetation handling mechanism still supported entirely on said carriage unit, whereby said carriage unit and said header unit can be connected together or disconnected without disturbing said vegetation handling mechanism on said header unit.

37. A windrow machine comprising a header unit which is detached from a thresher unit of a combined harvester-thresher, a carriage unit serving to support and impart mobility to said header unit, and a three-point connection between said units, comprising a push pole connected to both said header unit and said carriage unit, an axle on the header unit and an axle on the carriage unit united together, and a movable member on the carriage unit connected to said header unit to effect adjustment of said header unit with respect to the ground.

38. A windrow adapter for a header unit which is detached from a thresher unit of a combined harvester-thresher, said header unit having a push pole connection for receiving a push pole adapted to be connected to said thresher unit, a shaft adapted to be connected to said thresher unit, and a member adapted to be connected to a movable member on said thresher unit for effecting adjustment of said header unit; said adapter comprising a wheeled carriage unit having connecting means arranged in the same relative position as said aforementioned connecting means on said thresher unit, for connection with said push pole, said shaft and said member on said header unit.

39. A windrow adapter for a header unit which is detached from a thresher unit of a combined harvester-thresher, comprising a wheeled carriage, and means on said carriage for connection to said header unit.

40. A windrow machine comprising a header unit detached from the thresher unit of a combined harvester-thresher and normally immobile, a wheeled carriage unit for rendering said header unit mobile and for adapting said header unit to provide said windrow machine, and means uniting said units.

41. A windrow machine comprising a header unit detached from the thresher unit of a combined harvester thresher and normally immobile, a wheeled carriage unit for rendering said header unit mobile and for adapting said header unit to provide said windrow machine, means uniting said units, and driving means connected to a wheel on said carriage unit for operating vegetation handling mechanism on said header unit.

In testimony whereof, I have hereunto set my hand.

LOWELL H. THOEN.